(12) United States Patent
Ratasuk et al.

(10) Patent No.: US 8,611,442 B2
(45) Date of Patent: Dec. 17, 2013

(54) METHOD AND APPARATUS FOR CHANNEL SOUNDING IN AN ORTHOGONAL FREQUENCY DIVISION MULTIPLEXING COMMUNICATION SYSTEM

(75) Inventors: Rapeepat Ratasuk, Hoffman Estates, IL (US); Amitabha Ghosh, Buffalo Grove, IL (US); Bishwarup Mondal, Oak Park, IL (US)

(73) Assignee: Motorola Mobility LLC, Libertyville, IL (US)

( * ) Notice: Subject to any disclaimer, the term of this patent is extended or adjusted under 35 U.S.C. 154(b) by 475 days.

(21) Appl. No.: 12/848,448

(22) Filed: Aug. 2, 2010

(65) Prior Publication Data

US 2011/0243262 A1    Oct. 6, 2011

Related U.S. Application Data

(60) Provisional application No. 61/321,261, filed on Apr. 6, 2010.

(51) Int. Cl.
    *H04K 1/10*    (2006.01)
(52) U.S. Cl.
    USPC ......................................................... 375/260
(58) Field of Classification Search
    USPC .................. 375/220, 260; 370/329, 432, 437
    See application file for complete search history.

(56) References Cited

U.S. PATENT DOCUMENTS

| | | | |
|---|---|---|---|
| 8,023,990 B2 * | 9/2011 | Parkvall ........................ | 455/522 |
| 2006/0034165 A1 | 2/2006 | Levy | |
| 2009/0080504 A1 * | 3/2009 | Li et al. ........................ | 375/220 |
| 2009/0109908 A1 * | 4/2009 | Bertrand et al. .............. | 370/329 |
| 2009/0181687 A1 | 7/2009 | Tiirola et al. | |
| 2009/0238241 A1 | 9/2009 | Hooli et al. | |
| 2009/0323664 A1 | 12/2009 | Li et al. | |
| 2010/0009707 A1 | 1/2010 | Porat | |
| 2010/0080187 A1 * | 4/2010 | Papasakellariou et al. ... | 370/329 |
| 2011/0116464 A1 * | 5/2011 | Ishii et al. .................... | 370/329 |
| 2011/0150117 A1 * | 6/2011 | Zhou et al. ................... | 375/260 |
| 2011/0216713 A1 * | 9/2011 | Kim et al. ..................... | 370/329 |

OTHER PUBLICATIONS

3GPP, "3GPP TS 36.211 v9.0.0 Technical Specification," 3rd Generation Partnership Project; Technical Specification Group Radio Access Network; Evolved Universal Terrestrial Radio Access (E-UTRA); Physical Channels and Modulation (Release 9, Dec. 2009, 85 pages.
Panasonic, "R1-091172—Precoded SRS for LTE-Advanced," 3GPP TSG RAN WG1 Meeting #56bis, Seoul, Korea, Mar. 23-27, 2009, 3 pages.
Ericson, St-Ericsson, "R1-100056—On Sounding Reference Signal Enhancements," TSG-RAN WG1 #59bis, Valencia, Spain, Jan. 18-22, 2010, 2 pages.
Huawei, "R1-100808—Channel Sounding Capacity Improvements," 3GPP TSG-RAN WG1 #59bis, Valencia, Spain, Jan. 18-22, 2010, 7 pages.
Ericson, St-Ericsson, "R1-100860—Further Discussion on SRS Enhancements," 3GPP TSG-RAN WG1 #60, San Francisco, California, USA, Feb. 22-26, 2010, 3 pages.

(Continued)

*Primary Examiner* — Khanh C Tran (57) ABSTRACT

An Orthogonal Frequency Division Multiplexing communication system is provided that triggers a transmission of an uplink sounding signal by use of a Downlink Control Information (DCI) message. In various embodiments of the invention, the DCI message may be used to individually trigger an uplink sounding signal by a single user equipment or may be used to trigger an uplink sounding signal by a group of users equipment.

28 Claims, 7 Drawing Sheets

(56) References Cited

OTHER PUBLICATIONS

Huawei, "R1-101077—Sounding Capacity Enhancements Usind DMRS," 3GPP TSG-RAN WG1 #60, San Francisco, California, USA, Feb. 22-26, 2010, 4 pages.

Samsung, "R1-101190—Summary of Reflector Discussions on SRS Enhancements," 3GPP TSG-RAN WG1 #60, San Francisco, California, USA, Feb. 22-26, 2010, 2 pages.

Fong, et al., "Proposal for IEEE 802.16m Frame Structure and Protocol Architecture for Multi-Band Operation," IEEE 802.16 Broadband Wireless Access Working Group, Nortel Networks, Jan. 16, 2008, 6 pages.

Wang, et al., "UL Sounding Section for the IEEE 802.16m Amendment," IEEE 802.16 Broadband Wireless Access Group, Nokia Siemens Networks, Jan. 7, 2009, 2 pages.

Vook, et al., "Signaling Methodologies to Support Closed-Loop Transmit Processing in TDD-OFDMA," IEEE 802.16 Broadband Wireless Access Working Group, Motorola Labs, Communication Systems Research Laboratory, May 15, 2004, 23 pages.

Motorola: "Uplink sounding for obtaining channel state information at Node B in EUTRA", 3GPP Draft; R1-071342 UL Sounding, 3rd Geneneration Partnership Project (3GPP), Mobile Competence Centre; 650, Route Des Lucioles; F-06921 Sophia-Antipolis Cedex; France, vol. RAN WG1, no. St. Julian; 20070403, Apr. 3, 2007, all pages.

Motorola: "Improving UL Data Frequency Hopping Performance with Sounding and frequency Semi-Selective Scheduling", 3GPP Draft; R1-072684 UL Sounding and FSS Final, 3RD Generation Partnership Project (3GPP), Mobile Competence Centre; 650, Route Des Lucioles; F-06921 Sophia-Antipolis Cedex; France, vol. RAN WG1, no. Orlando, USA 20070620, Jun. 20, 2007, all pages.

Patent Cooperation Treaty, International Search Report and Written Opinion of the International Searching Authority for International Application No. PCT/US2011/030264, Jul. 5, 2011, 14 pages.

\* cited by examiner

METHOD AND APPARATUS FOR CHANNEL SOUNDING IN AN ORTHOGONAL FREQUENCY DIVISION MULTIPLEXING COMMUNICATION SYSTEM

CROSS-REFERENCE(S) TO RELATED APPLICATIONS(S)

The present application claims priority from provisional application Ser. No. 61/321,261, entitled "METHOD AND APPARATUS FOR CHANNEL SOUNDING IN AN ORTHOGONAL FREQUENCY DIVISION MULTIPLEXING COMMUNICATION SYSTEM," filed Apr. 6, 2010, which is commonly owned and incorporated herein by reference in its entirety.

FIELD OF THE INVENTION

The present invention relates generally to Orthogonal Frequency Division Multiplexing (OFDM) communication systems, and, in particular, to an exchange of channel response information in an OFDM communication system.

BACKGROUND OF THE INVENTION

The Third Generation Partnership Project (3GPP) Long Term Evolution (LTE) standards propose using an Orthogonal Frequency Division Multiple Access (OFDMA) for transmission of data over an air interface. In an OFDMA communication system, a frequency bandwidth is split into multiple contiguous frequency sub-carriers, wherein groups of sub-carriers are arranged in logical frequency resource blocks (not necessarily contiguous in frequency), each resource block comprising multiple orthogonal frequency sub-carriers, that are transmitted simultaneously. A user may then be assigned one or more of the frequency resource blocks for an exchange of user information, thereby permitting multiple users to transmit simultaneously on the different resource blocks. These resource blocks are orthogonal to each other, and thus inter-user and intra-cell interference is minimized.

In order to provide more efficient use of the channel bandwidth, a radio access network (RAN) may transmit the data using multiple antennas and a user equipment (UE) may receive the transmitted data using multiple receiving antennas, referred to as Multiple Input-Multiple Output (MIMO). In an OFDMA system that implements MIMO, a serving RAN may beamform a downlink signal for transmission to each UE via an antenna array and over an associated resource block. In order to beamform the signal, the RAN maintains a set of (transmit) weights in association with each UE and each element of the antenna array. When the RAN transmits to the UE, the RAN applies an appropriate weight, of the set of weights, to the signal applied to each element of the array. In order to determine the set of weights for each UE, the RAN measures uplink channel conditions in association with the UE. That is, for any given measuring period, such as a Transmission Time Interval (TTI) (also known as a sub-frame), a UE served by the RAN transmits a pre-determined symbol to the RAN in an uplink sounding interval, or sounding zone, that is reserved for the transmission of sounding signals. Based on a comparison of the symbol received to the symbol that the RAN knows was transmitted, the RAN is able to estimate channel conditions associated with the UE and determine a set of weights for a downlink transmission to the UE. The transmission of sounding signals can also used to support the scheduler to perform frequency selective scheduling of uplink data transmissions (applicable for both Time Division Duplex (TDD) and Frequency Division Duplex (FDD) scenarios).

Figure 1:
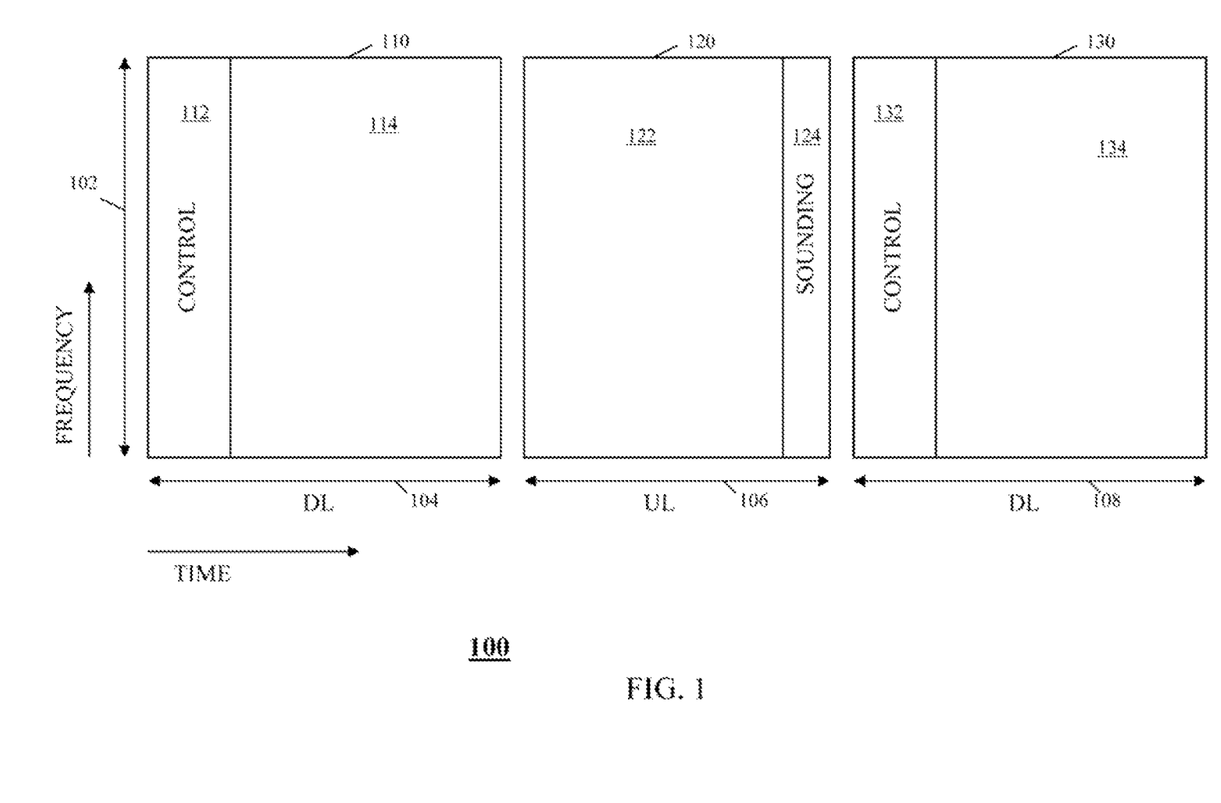
FIG. 1 is a block diagram of a scheme for channel sounding of a frequency bandwidth utilized by a prior art Orthogonal Frequency Division Multiple Access communication system.

For example, FIG. 1 is a block diagram 100 depicting a channel sounding for a TDD system of a frequency bandwidth 102 in accordance with the prior art. As depicted in FIG. 1, during a first transmission interval 104 a RAN transmits a first downlink (DL) sub-frame 110. During a next, second transmission interval 106 a UE served by the RAN transmits an uplink (UL) sub-frame 120 to the RAN, and during a next, third transmission interval 108 the RAN transmits a second DL sub-frame 130. In an FDD system, the frequency location of the DL and UL subframes are different, and the frequency bandwith 102 may be different as well.

Each DL sub-frame 110, 130 includes a control region 112, 132 and a DL data packet field 114, 134. Each DL sub-frame 110, 130 further may include reference signals that may be used by UEs for timing synchronization, frequency synchronization, and channel estimation. The control region 112, 132 contains several downlink control channels—the Physical Downlink Control Channel (PDCCH), the Physical Control Format Indicator Channel (PCFICH), and the Physical H-ARQ Indicator Channel (PHICH). The PCFICH provides information about the size of the control region. The PHICH provides H-ARQ acknowledgements for uplink data transmission. The PDCCH provides uplink and downlink scheduling assignment allocation, and power control commands. The downlink scheduling assignment allocation provides a subband allocation on the DL subframe, HARQ process number and coding and modulation scheme which is specific to a particular user. In addition, precoding information may also be provided. Similarly, the uplink scheduling assignment allocation provides a subband allocation on the UL subframe and coding and modulation scheme which is specific to a particular user.

UL sub-frame 120 includes an UL data packet field 122 and a sounding zone 124. UL data packet field 122 comprises UL bursts, that is, is the field in which the UEs transmit data packets to the RAN based on UL scheduling field 116. Sounding zone 124 is a field in which each of one or more UEs served the RAN transmits, over the frequency banmdwidth, a predetermined Sounding Reference Signal (SRS) known to both the RAN and the UE. In TDD, channel sounding assumes a reciprocity of the UL and DL channels and also assumes the RAN has a means of accounting for any non-reciprocities that may exist in the RAN transceiver hardware. Based in the received SRS, the RAN is able to estimate a RAN-to-UE channel response, adaptively schedule a resource block comprising a set of sub-carriers for a DL transmission to the UE, and adaptively determine a set of weights for the DL transmission to the UE over the scheduled set of sub-carriers. The RAN then conveys a DL burst 140 to the UE in a DL data packet field 138 of DL sub-frame 130 transmitted during the next time interval 108. The DL burst is transmitted over the scheduled set of sub-carriers and resource block using the set of weights determined based on the received SRS.

In addition to weight determination, the SRS can also be used for frequency selective scheduling in the uplink. Based on the transmitted SRS, the RAN measures the channel response in each of the resource block. When UL data transmission is scheduled, then RAN can then use information about each of the resource block in the resource block allocation.

Currently, under the 3GPP LTE standards, UEs are preconfigured to periodically transmit SRSs in the uplink. The SRS configuration is semi-static, for example, the UEs are preconfigured to transmit the SRS at a predetermined time and frequency using a predetermined orthogonal code, and accordingly only a limited number of SRSs, and correspondingly only a limited number of UEs, can be concurrently supported by a channel sounding-based system. In order to increase system capacity, a trigger-based SRS has been proposed for 3GPP LTE-A (Long Term Evolution-Advanced). However, no mechanism has been proposed for implementation of a trigger-based SRS.

Accordingly, a need exists for a method and apparatus for implementing a trigger-based SRS in an OFDMA communication system.

DETAILED DESCRIPTION OF THE INVENTION

To address the need for a method and an apparatus for implementing a trigger-based SRS in an Orthogonal Frequency Division Multiple Access (OFDMA) communication system, an Orthogonal Frequency Division Multiplexing (OFDM) communication system is provided that triggers a transmission of an uplink sounding signal by use of a Downlink Control Information (DCI) message. In various embodiments of the invention, the DCI message may be used to individually trigger an uplink sounding signal by a single user equipment (UE) or may be used to trigger an uplink sounding signal by a group of users equipment (UEs). The present invention and the following description apply to UEs sounding with one or multiple transmit antennas. The methods that are described henceforth for sounding using a single transmit antenna are assumed to be naturally extendable to multiple transmit antennas by someone skilled in the art. This includes methods where the sounding procedure is set up for transmit antenna-0 and the other antennas follow implicitly which may be configured or may be derived from system parameters. This also includes methods where the sounding procedure is set up for each transmit antenna separately in which case each antenna may be treated as a UE.

Generally, an embodiment of the present invention encompasses a method for providing channel sounding in an OFDM communication system. The method includes determining to request that a UE sound an uplink channel, transmitting a DCI message to the UE instructing the UE to convey a sounding signal, and in response to transmitting the DCI message, receiving a sounding signal from the UE over the uplink channel.

Another embodiment of the present invention encompasses a network element that controls channel sounding in an OFDM communication system, wherein the network element comprises a processor that is configured to determine to request a UE to sound an uplink channel, transmit a DCI message to the UE instructing the UE to convey a sounding signal and, in response to transmitting the DCI message, receive a sounding signal from the UE over the uplink channel.

Yet another embodiment of the present invention encompasses a user equipment (UE) that is capable of operating in an OFDM communication system and that comprises a processor that is configured to receive a DCI message instructing the UE to transmit a sounding signal and, in response to receiving the message, transmit a sounding signal from the UE over an uplink channel.

Figure 2:
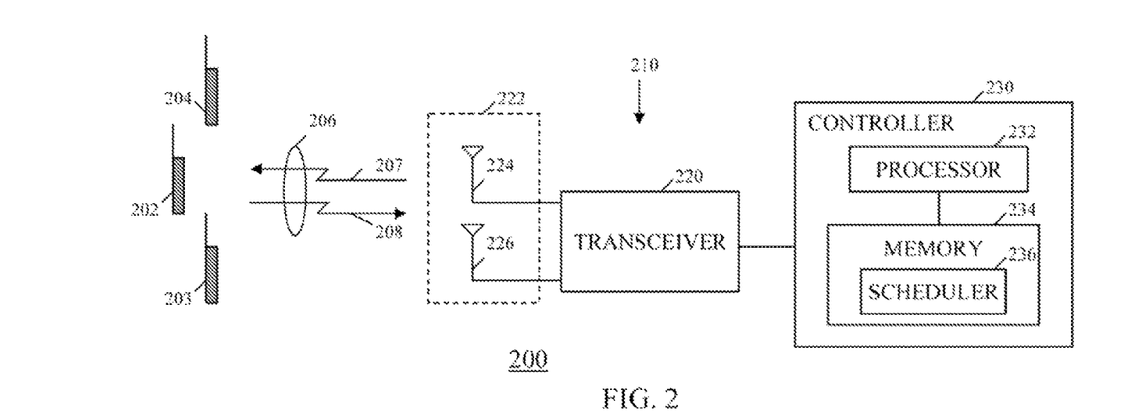
FIG. 2 is a block diagram of a wireless communication system in accordance with an embodiment of the present invention.

The present invention may be more fully described with reference to FIGS. 2-10. FIG. 2 is a block diagram of a wireless communication system 200 in accordance with an embodiment of the present invention. Communication system 200 includes multiple users' equipment (UEs) 202-204 (three shown), such as but not limited to a cellular telephone, a radio telephone, a personal digital assistant (PDA) with radio frequency (RF) capabilities, or a wireless modem that provides RF access to digital terminal equipment (DTE) such as a laptop computer. In various technologies, UEs 202-204 may be referred to as a mobile station (MS), subscriber unit (SU), access terminal (AT), and so on. Communication system 200 further includes a Radio Access Network (RAN) 210 that provides communication services to UE 202 via an air interface 206. RAN 210 includes a transceiver 220, such as a NodeB, an eNodeB, or a Base Transceiver Station (BTS) or simply a Base Station (BS), in wireless communication with UE 202 and further includes a network controller 230, such as a Radio Network Controller (RNC) or a Base Station Controller (BSC), coupled to the transceiver. Air interface 206 comprises a downlink (DL) 207 and an uplink (UL) 208. Each of DL 207 and UL 208 comprises multiple physical communication channels, including multiple control channels and multiple traffic channels.

Transceiver 220 is coupled to an antenna array 222 via a duplexer. Antenna array 222 comprises multiple antenna elements 224, 226 (two shown). By utilizing an antenna array to transmit signals to a UE located in a coverage area, such as a cell or sector serviced by the antenna array, RAN 210 is able to utilize a beamforming and/or MIMO technique for the transmission of the signals. Controller 230 includes a processor 232, such as one or more microprocessors, microcontrollers, digital signal processors (DSPs), combinations thereof or such other devices known to those having ordinary skill in the art. The particular operations/functions of processor 232, and thus of controller 230, are determined by an execution of software instructions and routines that are stored in a respective at least one memory device 234 associated with the processor, such as random access memory (RAM), dynamic random access memory (DRAM), and/or read only memory (ROM) or equivalents thereof, that store data and programs that may be executed by the corresponding processor. Transceiver 220 and controller 230 are elements of an infrastructure, or network, of communication system 200 and, accordingly, also may be referred to herein as network elements of communication system 200.

RAN 210 further includes a scheduler 236 that performs the scheduling functions described herein as being performed by the RAN, such as scheduling DL and UL data bursts for UEs serviced by the RAN, such as UE 202. As depicted in FIG. 2, scheduler 236 comprises data and software maintained in the at least one memory device 234 of controller 230 and implemented by processor 232 of the controller. However, in various other embodiments of the invention, scheduler 236 may be maintained in a memory of, and implemented by a processor of, transceiver 220, may comprise functions distributed between the transceiver and controller, or may be included in a network element separate from, and coupled to, the transceiver and the controller and comprising its own processor and at least one memory device.

Figure 3:
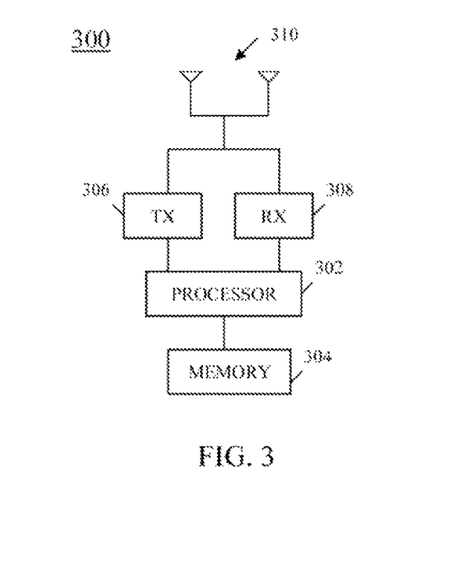
FIG. 3 is a block diagram of a user equipment in accordance with an embodiment of the present invention.
Figure 4:
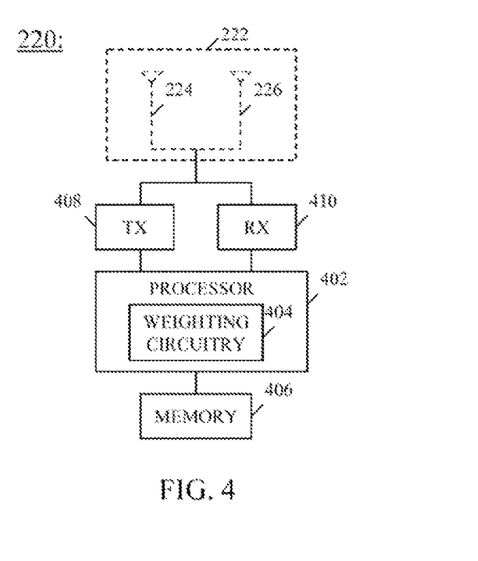
FIG. 4 is a block diagram of a transceiver in accordance with an embodiment of the present invention.

Referring now to FIGS. 3 and 4, block diagrams respectively are provided of a user equipment (UE) 300, such as UEs 202-204, and transceiver 220 in accordance with an embodiment of the present invention. Each of UE 300 and transceiver 220 includes a respective processor 302, 402, such as one or more microprocessors, microcontrollers, digital signal processors (DSPs), combinations thereof or such other devices known to those having ordinary skill in the art. The particular operations/functions of processors 302, 402 and respectively thus of UE 300 and transceiver 220, are determined by an execution of software instructions and routines that are stored in a respective at least one memory device 304, 406 associated with the processor, such as random access memory (RAM), dynamic random access memory (DRAM), and/or read only memory (ROM) or equivalents thereof, that store data and programs that may be executed by the corresponding processor.

Each of UE 300 and transceiver 220 further includes a respective transmitter 306, 408 and a respective receiver 308, 410, which transmitter and receiver are each coupled to the processor 302, 402 of the UE and transceiver. UE 300 further includes one or more antennas 310, and transceiver 220 further includes weighting circuitry 404 that implemented by processor 402 based on software instructions and routines that are stored in at least one memory device 406. However, in other embodiments of the present invention, weighting circuitry 404 may be implemented in a module separate from, and coupled to, processor 402. Weighting circuitry 404 weights signals that are applied to the multiple antenna elements 224, 226 of antenna array 222 based on a Sounding Reference Signal (SRS) received from UE 202 in order to beamform the signals for transmission to the UE over downlink 207.

Transceiver 220 further maintains, in at least one memory device 406 or weighting circuitry 404, a weighting matrix, which weighting matrix comprises multiple sets of weights and wherein each set of weights is associated with a UE and a combination of antenna elements for downlink DL to the UE, and provides the weights applicable to signals conveyed to each of the antenna elements for such a DL transmission.

For each of the multiple UEs 202-204, the weights are determined by RAN 210, for example, by scheduler 236 and/or transceiver (for example, an eNodeB) 220, based on an UL sounding signal received from the UE. That is, based on the UL sounding signal, RAN 210 determines a channel response associated with the UE and computes a set of complex weights based on the determined channel response. The set of complex weights include Eigen Beamforming (EBF) or Max-Ratio Transmission (MRT) vectors derived from the UL sounding signal measurements. The UL sounding signals received from multiple UEs may be processed to jointly determine complex weights for multiple UEs (for multi-user transmission). In conjunction with other information received from UEs (channel quality information, or CQI), the sounding signals may also be used to determine transmission parameters such as rank, modulation coding rate (MCR) as well as resource allocation for downlink transmission. The UL sounding signals from a UE can be received and processed by a serving eNodeB as well as non-serving eNodeBs. The sounding information received at one eNodeB may be processed and shared with multiple eNodeBs. The transmit weights and other transmission parameters for a UE may be determined by coordinating with multiple eNodeBs.

The embodiments of the present invention preferably are implemented within UEs 202-204, transceiver 220, and controller 230, and more particularly with or in software programs and instructions stored in the respective at least one memory devices 304, 406, 234 and executed by respective processors 302, 402, 232. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 202-204, transceiver 220, and controller 230. Based on the present disclosure, one skilled in the art will be readily capable of producing and implementing such software and/or hardware without undo experimentation. Furthermore, unless otherwise specified herein, the functions described herein as being performed by RAN 210 preferably are performed by scheduler 236, and more particularly by a processor associated with the scheduler based on programs and instructions stored in an at least one memory device associated with the scheduler.

Communication system 200 comprises an Orthogonal Frequency Division Multiple Access (OFDMA) modulation scheme for transmitting data over air interface 206, wherein a frequency channel, or bandwidth, 802 (see FIGS. 8 and 9) is split into multiple frequency resource blocks, or resource blocks, during a given time period. Each resource block comprises multiple orthogonal frequency sub-carriers over a given number of OFDM symbols, that are the physical layer channels over which traffic and signaling channels are transmitted in a TDM or TDM/FDM fashion. A communication session may be assigned a resource block or a group or groups of resource blocks for an exchange of bearer information, thereby permitting multiple users to transmit simultaneously on the different resource blocks such that each user's transmission is orthogonal to the other users' transmissions. A resource block may also be assigned to multiple users in which case the users are no longer orthogonal but they can be separated based on spatial signatures of the individual transmit weights.

In addition, communication system 200 preferably operates according to the Third Generation Partnership Project (3GPP) Long Term Evolution-Advanced (LTE-A) standards, which standards specify wireless telecommunications system operating protocols, including radio system parameters and call processing procedures. However, those who are of ordinary skill in the art realize that communication system 200 may operate in accordance with any wireless telecommunication standard employing an Orthogonal Frequency Division Multiplexing (OFDM) modulation scheme, such as but not limited to other 3GPP communication systems employing channel sounding, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE 802.xx standards, for example, the 802.11a/HiperLAN2, 802.11g, or 802.20 standards, or a Worldwide Interoperability for Microwave Access (WiMAX) communication system that operates in accordance with the IEEE (Institute of Electrical and Electronics Engineers) 802.16 standards, including 802.16e and 802.16m.

In order to efficiently utilize the channel bandwidth of communication system 200, RAN 210 may transmit data using the multiple antennas 224, 226 of antenna array 222, and a UE 202-204 may receive the transmitted data using one or more receiving antennas, the use of multiple receiving antennas referred to as Multiple Input-Multiple Output (MIMO). RAN 210, and in particular transceiver 220, beamforms a downlink (DL) signal for transmission to each UE via antenna array 222 and over a resource block scheduled for the UE. In order to beamform the signal, RAN 210 determines a set of (transmit) weights in association with each UE and each element of the antenna array. When the RAN transmits to the UE, the RAN, and in particular transceiver 220, applies an appropriate weight to the signal applied to each antenna 224, 226 of antenna array 222. In order to adaptively determine the set of weights for each UE, and further to adaptively schedule the UE for a resource block that is optimal for that UE, the RAN measures uplink (UL) channel conditions in association with the UE. That is, for any given measuring period, such as a Transmission Time Interval (TTI) (also known as a subframe), a UE served by the RAN transmits a pre-determined signal or symbol, that is, a sounding signal and in particular a Sounding Reference Signal (SRS), to the RAN. However, in other embodiments of the present invention, the predetermined signal transmitted by a UE may comprise an uplink demodulation reference signal (UL DM-RS) and such an UL DM-RS signal can be used in place of an SRS or sounding signal. Based on a comparison of the symbol received to the symbol that the RAN knows was transmitted, the RAN is able to estimate channel conditions for the UE in the allocated resource block and determine a set of weights for a downlink transmission to the UE in the resource block.

In order to efficiently utilize the channel bandwidth of communication system 200, RAN 210 may instruct the UE to transmit uplink data only on certain uplink resource blocks with good channel quality. This frequency-selective scheduling technique has been shown to improve the spectrum efficiency substantially. The RAN can determine which resource block is of high channel quality by instructing the UE to transmit the SRS. Based on SINR (signal to interference plus noise ratio) measurements performed at the RAN using the SRS transmitted by the UE, the RAN is able to ascertain the channel quality for each of the resource blocks. When UE has pending uplink data transmission, the RAN can then instruct the UE via the DCI on the PDCCH to transmit its uplink data on the high-quality resource blocks.

In communication system 200, transmission, by the UE, of a sounding signal is triggered by RAN 210. More specifically, RAN 201 conveys a modified version of a Downlink Control Information signal to the UE that triggers a transmission, by the UE, of a sounding signal. In one embodiment of the present invention, the sounding signal trigger may be a group trigger that is used to trigger transmission of sounding signals by one or more UEs that are members of a group of UEs. In another embodiment of the present invention, the sounding signal trigger may be an individual trigger that is intended for, and triggers transmission of sounding signals by, a single UE. In still other embodiments of the present invention, the UE may convey a sounding signal only when triggered to do so or may convey sounding signals both periodically and when triggered to do so. If a UE is instructed to convey sounding signals in a subframe by multiple methods, one method may be prioritized.

Figure 5A:
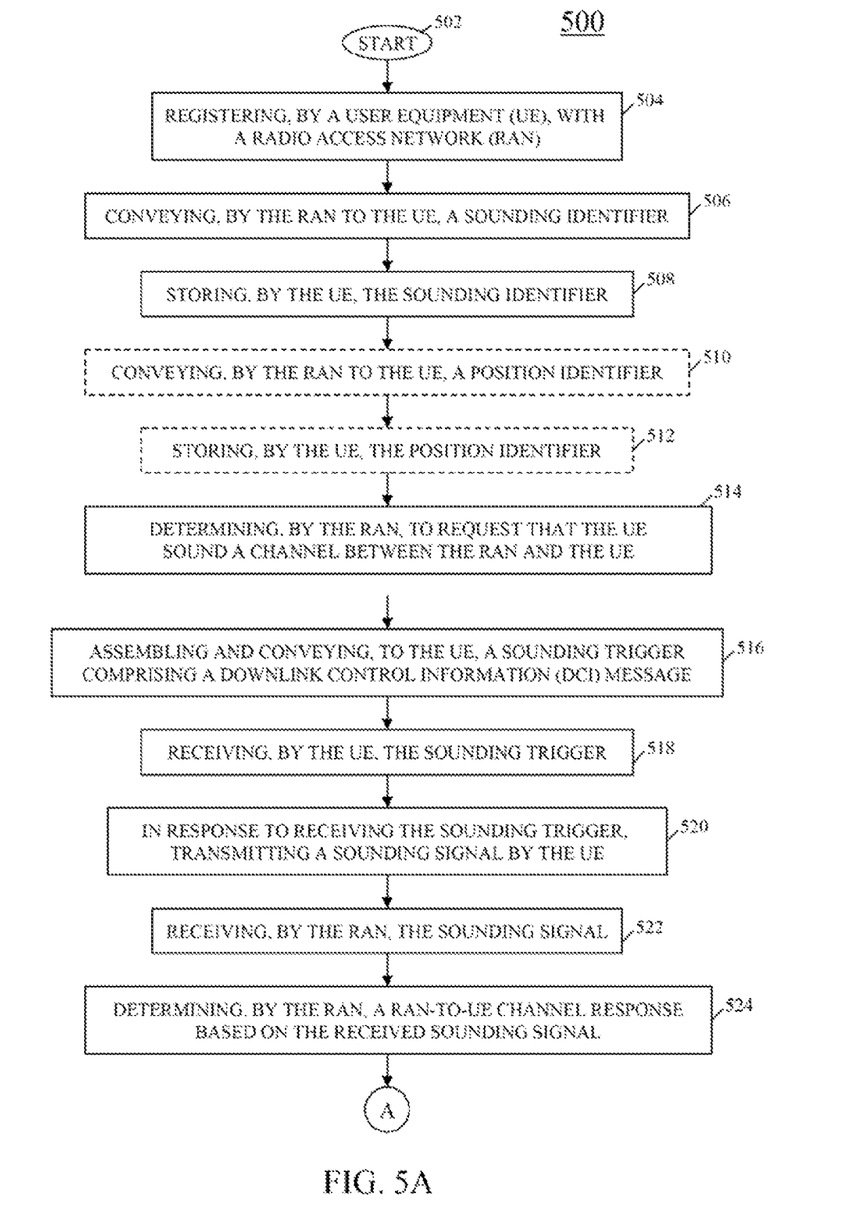
FIG. 5A is a logic flow diagram of a method for channel sounding of a frequency bandwidth of the communication system of FIG. 2 in accordance with various embodiments of the present invention.

Referring now to FIG. 5, a logic flow diagram 500 is provided that depicts a method for channel sounding of a frequency bandwidth of communication system 200 in accordance with various embodiments of the present invention. Logic flow diagram 500 begins (502) when a UE 202-204, such as UE 202, registers (504) with RAN 210. As part of the registration process, or subsequent to the UE, that is, UE 202, registering with RAN 210, the RAN conveys (506) to the UE, preferably in a Radio Resource Control (RRC) message, a sounding identifier that the UE will use to determine whether the UE is an intended recipient of a sounding trigger transmitted by the RAN.

In one embodiment of the present invention, the sounding identifier may be a known temporary UE identifier that is uniquely associated with the UE while serviced by RAN 210, such as a C-RNTI (Cell-Radio Network Temporary Identifier). In another embodiment of the present invention, a 'sounding group' embodiment, the identifier may be a group identifier that is assigned to each member of a 'sounding group,' that is, a group of UEs that collectively are instructed whether or not to perform a sounding procedure, that is, to convey an SRS to the RAN.

In the 'sounding group' embodiment, as part of the registration process, or subsequent to the UE, that is, UE 202, registering with RAN 210, the RAN assigns the UE to a sounding group comprising multiple UEs, for example, also comprising UEs 203 and 204, that are collectively instructed whether or not to perform a sounding procedure, that is, to convey an SRS to the RAN. By collectively, it is meant that a same DL control message is used to instruct all of the members of the group, preferably on a UE-by-UE basis, whether to convey an SRS to the RAN in a next UL sub-frame. RAN 210 then conveys to UE 202, via a DL control message, the sounding group identifier, preferably an SRS-RNTI (Radio Network Temporary Identifier), that also is provided by RAN 210 to all other members of the sounding group. In various embodiments of the present invention, the sounding group identifier may be generated by the processor associated with scheduler 236 and, after assigned to a group, stored in an at least one memory device associated with the scheduler, or the at least one memory device associated with the scheduler may maintain a list of sounding group identifiers for assignment to groups of UEs, from which list the scheduler selects a sounding group identifier to assign to a particular group.

Numerous bases for grouping UEs served by RAN 210 into sounding groups may occur to one of ordinary skill in the art, and any such basis may be used herein without departing from the spirit of the present invention. For example, the UEs that are members of a sounding group may be predetermined or may be determined by RAN 210 based on geographical locations of UEs served by the RAN (for example, UEs within a given geographical range of each other), a quality of a signal received by each of the UEs from the RAN 210 and reported by the UE to the RAN, such as a received signal strength, a carrier to interference ratio, a signal to interference ratio, a bit error rate, a frame error rate, a reported Channel Quality Information (CQI), and so on (for example, UEs whose received signal quality is above a given threshold, below a given threshold, or between two thresholds, which threshold (s) may be predetermined or dynamically determined), a quality of a signal received by the RAN from each of the UEs, a quality of a channel between the RAN and each of the UEs, a traffic type of a communication engaged in by each UE, SRS requirements for each UE, and any other basis for group formation known to one of ordinary skill in the art. The grouping of UEs as well as other sounding parameters including sounding time-frequency locations, sequences, and power can be determined by a serving eNodeB in coordination with other eNodeBs. The sounding signal transmitted by a UE can be received and processed by a serving eNodeB as well as non-serving eNodeBs.

In response to receiving the sounding identifier, UE 202 stores (508) the sounding identifier in the at least one memory device 304 of the UE. When the sounding identifier is a sounding group identifier, the identifier then is used by each UE that is a member of the sounding group, such as UEs 202-204, to detect a sounding trigger intended for the UE and broadcast by the RAN over a DL control channel, such as a Physical Downlink Control Channel (PDCCH).

RAN 210 controls channel sounding by the multiple UEs 202-204 by triggering when the UEs are to perform channel sounding. That is, at some point in time, RAN 210 determines (514) to request that UE 202 sound an UL 208 channel between the RAN and UE, that is, convey a sounding signal over the channel, for example, so that the RAN can estimate a channel quality of DL 207, and more particularly a RAN 210-to-UE, for example, to UE 202, channel response. For example, RAN 210 may assume that the UL and DL channel characteristics are the approximately the same. RAN 210, and in particular scheduler 236, then triggers a channel sounding by the UE, that is, UE 202, by assembling and conveying (516), to UE 202, a sounding trigger comprising a modified version of a Downlink Control Information (DCI) message, which modified DCI message instructs the UE to perform channel sounding, that is, to transmit a sounding signal, and in particular a Sounding Reference Signal (SRS) comprising a known, predetermined OFDM symbol (a 'sounding symbol') in a sounding zone of a next UL subframe. The modified DCI message preferably is transmitted over a Physical Downlink Control Channel (PDCCH) of downlink 207 and is modified to include sounding trigger information.

Figure 6:
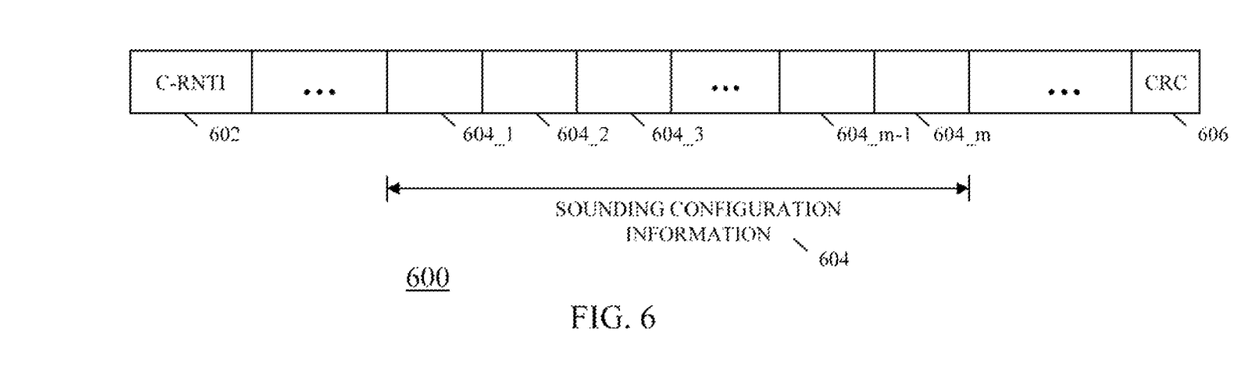
FIG. 6 is a block diagram of an exemplary modified Downlink Control Information message used to trigger a channel sounding in accordance with an embodiment of the present invention.

In one embodiment of the present invention, the sounding trigger may be a trigger that is singularly directed at UE 202. Referring now to FIG. 6, a block diagram is provided of an exemplary modified DCI message 600 that may be used to provide an 'individual' sounding trigger in accordance with an embodiment of the present invention. DCI message 600 includes a first data field 602 comprising an identifier (C-RNTI) associated with the UE being instructed to send a sounding message, and a second data field 604 that includes sounding configuration information. However, in another embodiment of the present invention, instead of including data field 602 (C-RNTI) in DCI message 600, a CRC 606 of the DCI message may be masked using the identifier (C-RNTI) associated with the UE so that only the UE in possession of the identifier is able to correctly decode the message.

The sounding configuration information comprises information concerning a configuration of the sounding signal that the UE is being instructed to send. For example, sounding configuration information data field 604 may be sub-divided into multiple smaller data fields 604$_1$-604$_m$, where each such data field includes sounding configuration information such as a frequency location of one or more resource blocks/sub-carriers allocated for transmission of the sounding signal, one or more time periods (OFDM symbol) during which to transmit the sounding signal on one or more of the allocated resource blocks/sub-carriers, an orthogonal code to use for the sounding signal, a transmission comb parameter, a cyclic shift parameter, a power control parameter, a hopping parameter, an antenna index parameter and parameters specifying a choice between resources specified as UL DM-RS or SRS or a combination of both. By providing for such sounding configuration information to be provided in the trigger message, less pre-configuration of the sounding signal is required by communication system 200 than is the case in the prior art and RAN 210 may adaptively configure the UE's sounding signal on a trigger-by-trigger basis. In addition, for a system supporting carrier aggregation (that is, simultaneous reception and transmission on more than one carriers), a carrier index field can also be added to the sounding configuration information data fields. Alternatively, an implicit carrier index selection can be included in the configuration fields. Implicit carrier index can be based, for example, on the subframe the UE was triggered, the UE's assigned frequency location, or control channel elements used to trigger the UE.

Figure 7:
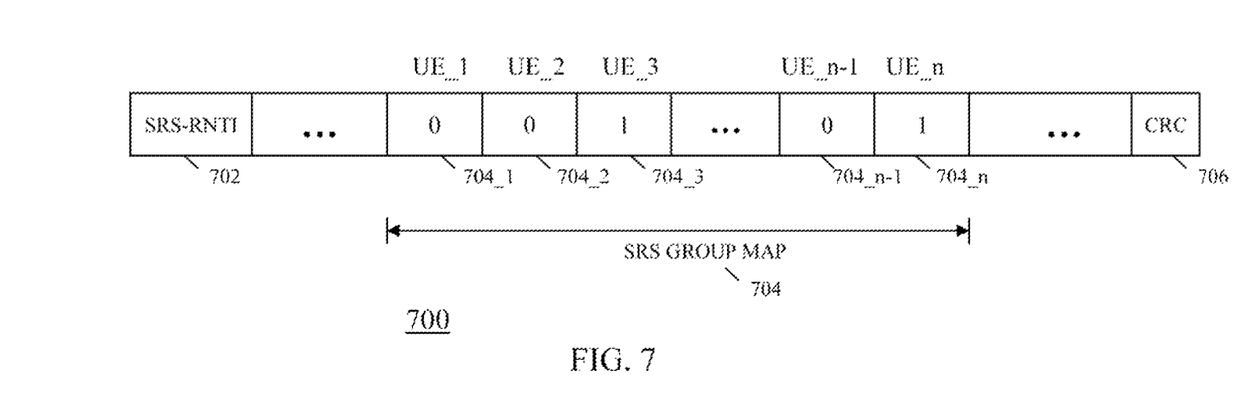
FIG. 7 is a block diagram of an exemplary modified Downlink Control Information message used to trigger a channel sounding in accordance with another embodiment of the present invention.

Referring now to FIG. 7, a block diagram is provided of an exemplary modified DCI message 700 that may be used to provide a 'group sounding' trigger in accordance with another embodiment of the present invention. DCI message 700 includes a first data field 702 comprising a sounding group identifier (SRS-RNTI) and a second data field 704 that includes a sounding signal, or SRS, group map. The sounding signal, or SRS, group map identifies which UEs, in a group of UEs, are instructed to transmit a sounding signal. RAN 210 transmits the instruction over a DL control channel, preferably the PDCCH. However, in another embodiment of the present invention, instead of including data field 702 comprising the sounding group identifier (SRS-RNTI) in DCI message 700, a CRC 706 of the DCI message may be masked using the sounding group identifier (SRS-RNTI) so that only a UE in possession of the sounding group identifier is able to correctly decode the message.

Data field 704, comprising the SRS Group Map, (also referred to herein as SRS Group Map 704) is sub-divided into multiple smaller data fields 704$_1$-704$_n$, wherein each such data field 704$_1$-704$_n$ is associated with a particular UE that is a member of a group of UEs, that is, $UE_1, UE_2, UE_3, \ldots, UE_n$. Each data field 704$_1$-704$_n$ includes a value that indicates whether the corresponding UE, that is, $UE_1$-$UE_n$, is instructed to transmit an SRS. For example, when RAN 210 embeds a value of '1' in a data field 704$_1$-704$_n$, then this indicates that the corresponding UE is instructed to transmit an SRS in a sounding zone of a next UL sub-frame and when RAN 210 embeds a value of '0' in a data field 704$_1$-704$_n$, this indicates that the corresponding UE is instructed to not transmit in a sounding zone of a next UL sub-frame. Thus, each of data fields 704$_1$-704$_n$ may be as small as a single bit, minimizing the overhead consumed by SRS Group Map 704. For example, second data field 704 of DCI message 700 indicates that $UE_3$ and $UE_n$ are instructed to transmit a sounding signal, or SRS, in a sounding zone of a next UL sub-frame and that $UE_1$, $UE_2$, and $UE_{n-1}$ are not to transmit during a sounding zone of the next UL sub-frame.

Each UE that is a member of the sounding group is pre-configured, prior to receiving the message, to look at a particular data field 704$_1$-704$_n$ to determine whether the UE is being instructed to transmit a sounding signal. For example and referring again to FIG. 5, when RAN 210 conveys the sounding group identifier to the UE, the RAN may further indicate (510) in the same control message, a position identifier that identifies a position of a data field $704_1$-$704_n$ in SRS Group Map 704 that is associated with the UE. Again, the UE, in response to receiving control message, then stores (512) the position identifier in the at least memory device 304 of the UE.

Figure 8:
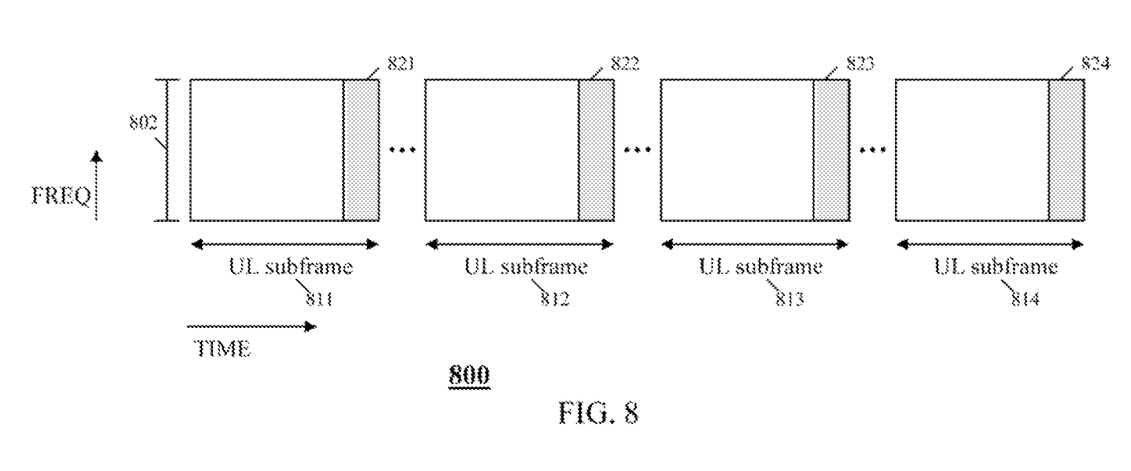
FIG. 8 is a block diagram illustrating a channel sounding by a user equipment of the communication system of FIG. 2 in accordance with an embodiment of the present invention.

In response to RAN 210 conveying, at step 516, an instruction to UE 202 to transmit a sounding signal, and the UE receiving (518) the instruction, the UE transmits (520), over designated sub-carriers of the frequency bandwidth, a sounding signal in one or more succeeding sounding zones. For example and referring now to FIGS. 8 and 9, block diagrams are provided that illustrate sounding by a UE, such as UEs 202-204, in accordance with various embodiments of the present invention. Referring first to FIG. 8, a block diagram 800 depicts sounding by a UE across an entire bandwidth 802 of communication system 200 by a UE in accordance with an embodiment of the present invention. That is, in response to receiving an instruction to perform a sounding process, a UE, such as UEs 202-204, sounds, that is, transmits, in a sounding zone 821 of a next uplink subframe 811, a sounding signal, that is an SRS, that spans the entire bandwidth 802 of communication system 200. Thus a single SRS provides RAN 210 with a indication of a channel response of the entire bandwidth. The UE then may be separately instructed, by RAN 210 to sound in each of the sounding zones 822-824 of succeeding uplink subframes 812-814, or in response to receiving the instruction may continue to sound across the entire bandwidth 802 for a predetermined number of sounding zones before ceasing to sound until again being instructed to do so.

Figure 9:
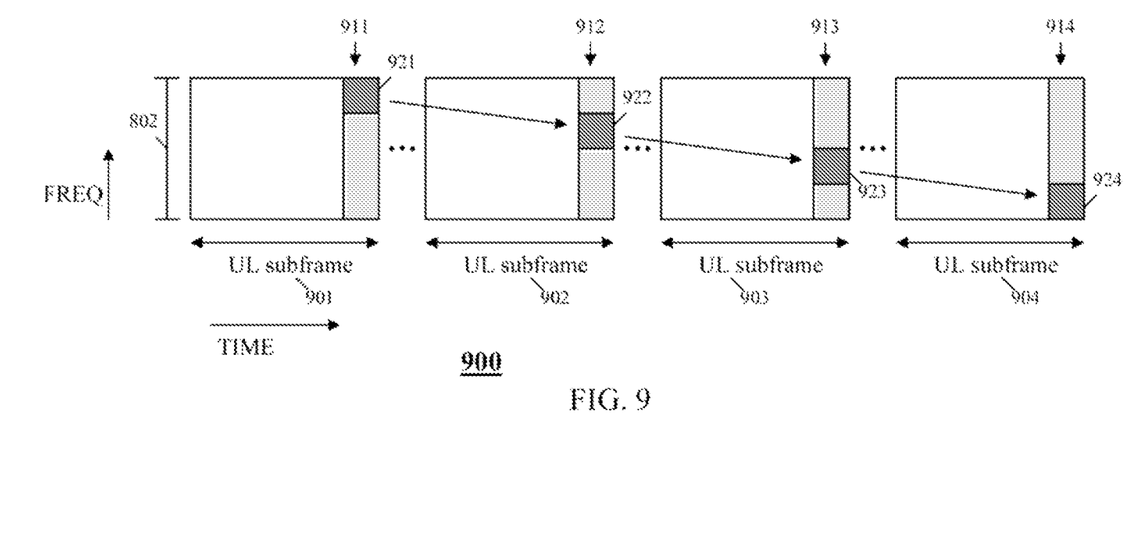
FIG. 9 is a block diagram illustrating a channel sounding by a user equipment of the communication system of FIG. 2 in accordance with another embodiment of the present invention.

Referring now to FIG. 9, a block diagram 900 is provided that depicts sounding by a UE, such as UEs 202-204, across an entire bandwidth 802 of communication system 200 in accordance with another embodiment of the present invention. In the sounding process depicted in FIG. 9, in response to receiving an instruction to perform a sounding process, the UE hops the sounding signal, that is, the SRS, across bandwidth 802 over the course of several sounding zones, sounding only a portion of the bandwidth in each sounding zone. That is, the sounding configuration information conveyed by RAN 210 to a UE, such as UE 202, may include an indication that the UE is to hop across frequency bandwidth 802 over multiple time periods in sounding the channel. In response to receiving the sounding configuration information, the UE then sounds, that is, transmits a sounding signal, that is an SRS, in only a first portion, that is, a first set of subcarriers, 921 of bandwidth 802 in a first sounding zone 911 of a first uplink subframe 901. In a next, second uplink subframe 902, the UE sounds, that is, transmits a sounding signal, in only a second portion, that is, a second set of subcarriers, 922 of bandwidth 802 in a second sounding zone 912. In a following, third uplink subframe 903, the UE sounds, that is, transmits a sounding signal, in only a third portion, that is, a third set of subcarriers, 923 of bandwidth 802 in a third sounding zone 913. And in a next, fourth uplink subframe 904, the UE sounds, that is, transmits a sounding signal, in only a fourth portion, that is, a fourth set of subcarriers, 924 of bandwidth 802 in a fourth sounding zone 914. Each of the first, second, third, and fourth sets of subcarriers 921-924 of bandwidth 802 are different from the other sets of subcarriers 921-924 of bandwidth 802, and collectively the first, second, third, and fourth portions 921-924 of bandwidth 802 cover the entirety of bandwidth 802.

One of ordinary skill in the art realizes that the hopping may involve either fewer or more than four uplink subframes/sounding zones, that the sets of subcarriers of bandwidth 802 covered in each sounding may or may not overlap with the sets of subcarriers of bandwidth 802 covered in the other soundings when hopping, and that the sets of subcarriers of bandwidth 802 covered in each successive sounding as depicted in FIG. 9 may or may not be consecutive or contiguous sets of subcarriers, for example, the UE may first sound the set of subcarriers 921, then sound the set of subcarriers 923, then sound the set of subcarriers 922, and finally sound the set of subcarriers 924.

Figure 5B:
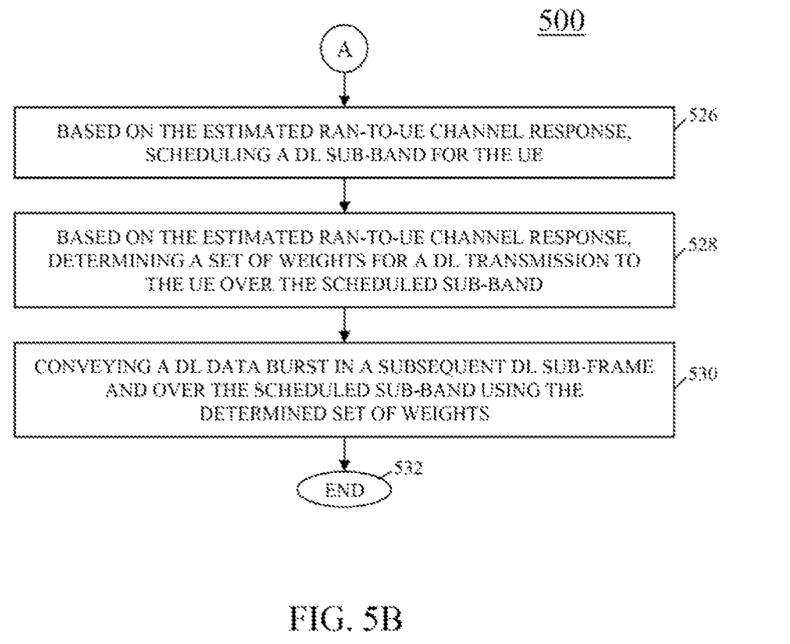
FIG. 5B is a continuation of the logic flow diagram of FIG. 5A depicting a method for channel sounding of a frequency bandwidth of the communication system of FIG. 2 in accordance with various embodiments of the present invention.

Referring again to FIG. 5, in response to receiving (522) the sounding signal, RAN 210, and in particular scheduler 236, determines (524) a RAN-to-UE channel response using techniques known in the art and based on the received sounding signal. Based on the determined RAN-to-UE channel response, RAN 210, and in particular scheduler 236, schedules (526) a resource block comprising sub-carriers 562 for a DL transmission to the UE and determines (528) a set of weights in association with the multiple antenna elements 224, 226 of antenna array 222 for a DL transmission to the UE over the scheduled resource block. The set of weights then may be stored in at least one memory device 234. In other embodiments of the present invention, the set of weights may be determined by transceiver (for example, an eNodeB) 220, and in particular by processor 232, and then stored in at least one memory device 420 or weighting circuitry 404 of the transceiver. At some point, these weights then are conveyed to weighting circuitry 404 and RAN 210, and in particular transceiver 220, then conveys (530) a DL data burst to the UE in a DL data packet field of a subsequent DL sub-frame that is transmitted during subsequent sub-frame transmission interval. The DL data burst is transmitted over the scheduled resource block via antenna array 222, wherein weighting circuitry 404 applies, to a signal applied to each of the multiple antenna elements 224, 226, a weight of the set of weights that are determined based on the received sounding signal. In various embodiments of the present invention, the weights may be used for a transmission via a subsequent sub-frame other than the next sub-frame or may be used for transmissions via multiple subsequent sub-frames. Logic flow 500 then ends (532).

Figure 10:
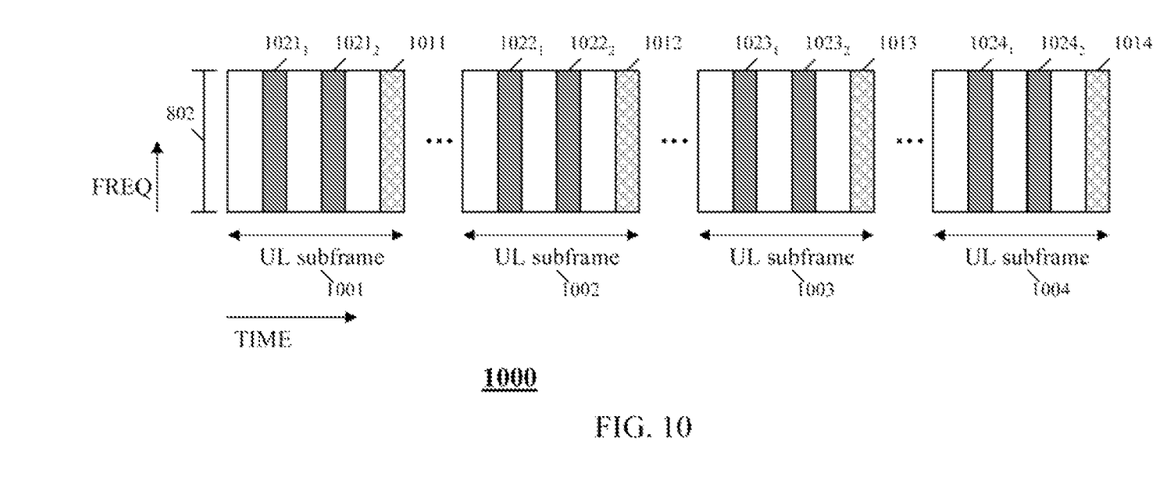
FIG. 10 is a block diagram illustrating a channel sounding by a user equipment of the communication system of FIG. 2 in accordance with another embodiment of the present invention.

In still another embodiment of the present invention, a UE may be instructed to transmit a sounding signal, that is, an SRS, that overlaps in time with reference symbols, such as pilot symbols, or data symbols, in addition to or instead of being instructed to transmit a sounding signal during a sounding zone, such as sounding zones 821-824 and 911-914. By use of MU-MIMO demodulation and decoding techniques, RAN 210, and in particular transceiver 220, then is able to separate the SRS from other reference or data symbols of other scheduled users sharing a same resource block and OFDM symbol. For example and referring now to FIG. 10, each uplink subframe of multiple uplink subframes 1001-1004 includes a corresponding sounding zone 1011-1014 and one or more reference symbols, such as pilot symbols, and/or data symbols $1021_1$, $1021_2$, $1022_1$, $1022_2$, $1023_1$, $1023_2$, $1024_1$, and $1024_2$. A 'group' or 'individual' sounding trigger, that is, the modified DCI, may, in addition to instructing a UE to transmit a sounding signal, also identify an OFDM symbol either inside or outside of the sounding zone, such as OFDM symbols $1021_1$, $1021_2$, $1022_1$, $1022_2$, $1023_1$, $1023_2$, $1024_1$, and $1024_2$, in which to transmit the sounding signal. For example, the sounding configuration information 604 of DCI 600 may include such information, or each data field $704_1$-$704_n$ of SRS Group Map 704 may include an additional one or more bits that identify an OFDM symbol in each of one or more uplink subframes that is not in the sounding zone for transmission of the SRS by the corresponding UE, that is, $UE_1$-$UE_n$.

In yet another embodiment of the present invention, a UE may be configured for both periodic transmission of sounding signals, that is, SRSs, and for transmission of a sounding signal in response to receiving a sounding signal trigger. In such an event, the periodic transmission of sounding signals may take precedence over the trigger-based transmission of a sounding signal. That is, even though the UE is configured for a trigger-based transmission of a sounding signal, nevertheless the UE will periodically transmit sounding signals and will, in addition, transmit a sounding signal when triggered to do so, that is, in response to receipt, from RAN 210, of an instruction to transmit a sounding signal.

In still another embodiment of the present invention, a UE may be triggered using higher-layer messaging (for example, Media Access Control (MAC) or Radio Resource Control (RRC) messages) to transmit the SRS. When compared to triggering via DCI on the PDCCH, higher-layer messaging incurs longer latency and higher overhead. In addition, higher-layer messaging is addressed to individual users, and cannot be used for triggering a group of users.

In yet another embodiment of the present invention, broadcast messaging (for example, via a control message that is broadcast on the Physical Broadcast Channel) may be sued to trigger the UE to transmit the SRS. When compared to triggering via DCI on the PDCCH, broadcast messaging incurs higher overhead in the amount of transmission power or the number of resource blocks, as the broadcast message must be transmitted with sufficient power or coding to reach the entire cell. The PDCCH, however, only has to be decoded correctly by the intended user or group of users, and thus requires much lower transmission power or number of resource blocks.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing channel sounding in an Orthogonal Frequency Division Multiplexing communication system, the method comprising:

determining to request that a user equipment sound an uplink channel;

transmitting a Downlink Control Information message to the user equipment instructing the user equipment to convey a sounding signal, wherein the Downlink Control Information message comprises a sounding signal group map that is associated with a sounding group comprising an plurality of users equipment and wherein the sounding signal group map identifies which user equipment, among the plurality of users equipment, is instructed to transmit a sounding signal; and in response to transmitting the Downlink Control Information message, receiving a sounding signal from the user equipment over the uplink channel.

2. The method of claim 1, wherein transmitting a Downlink Control Information message to a user equipment comprises transmitting a Downlink Control Information message to a user equipment over a Physical Downlink Control Channel.

3. The method of claim 1, wherein the Downlink Control Information message comprises sounding configuration information associated with the user equipment, which sounding configuration information comprises one or more of:

a frequency location of one or more sub-carriers allocated for transmission of the sounding signal, a time period during which to transmit the sounding signal, a cyclic shift parameter, a hopping parameter, an antenna index, a carrier index, and an orthogonal code to use for the sounding signal.

4. The method of claim 3, wherein the time period during which to transmit the sounding signal comprises a time period during which another user equipment transmits one or more of a pilot signal and a data signal.

5. The method of claim 3, wherein the sounding configuration information comprises an indication that the user equipment is to hop across a frequency bandwidth over a plurality of time periods in sounding the uplink channel.

6. The method of claim 3, wherein the Downlink Control Information message comprises a Cell-Radio Network Temporary Identifier associated with the user equipment.

7. The method of claim 6, further comprising masking the Downlink Control Information message using the Cell-Radio Network Temporary Identifier.

8. The method of claim 1, further comprising one or more of:

scheduling a downlink transmission to the user equipment based on the received sounding signal, and determining a set of weights in association with a plurality of antenna elements for a downlink transmission to the user equipment based on the received sounding signal.

9. The method of claim 1, further comprising one or more of:

scheduling an uplink transmission to the user equipment based on the received sounding signal, and determining a set of assigned resource blocks based on the received sounding signal.

10. The method of claim 1, further comprising, in addition to receiving a sounding signal in response to transmitting the Downlink Control Information message, also receiving a periodic sounding signal from the user equipment over the uplink channel.

11. A network element that controls channel sounding in an Orthogonal Frequency Division Multiplexing communication system, wherein the network element comprises a processor that is configured to determine to request a user equipment to sound an uplink channel, transmit a Downlink Control Information message to the user equipment instructing the user equipment to convey a sounding signal, wherein the Downlink Control Information message comprises a sounding signal group map that is associated with a sounding group comprising an plurality of users equipment and wherein the sounding signal group map identifies which user equipment, among the plurality of users equipment, is instructed to transmit a sounding signal and, in response to transmitting the Downlink Control Information message, receive a sounding signal from the user equipment over the uplink channel.

12. The network element of claim 11, wherein the processor is configured to transmit a Downlink Control Information message to a user equipment by transmitting a Downlink Control Information message to a user equipment over a Physical Downlink Control Channel.

13. The network element of claim 11, wherein the Downlink Control Information message comprises sounding configuration information associated with the user equipment, which sounding configuration information comprises one or more of:
- a frequency location of one or more sub-carriers allocated for transmission of the sounding signal,
- a time period during which to transmit the sounding signal,
- a cyclic shift parameter,
- a hopping parameter,
- an antenna index,
- a carrier index, and
- an orthogonal code to use for the sounding signal.

14. The network element of claim 13, wherein the sounding configuration information comprises an indication that the user equipment is to hop across a frequency bandwidth over a plurality of time periods in sounding the uplink channel.

15. The network element of claim 13, wherein the Downlink Control Information message comprises a Cell-Radio Network Temporary Identifier associated with the user equipment.

16. The network element of claim 15, wherein the processor is configured to mask the Downlink Control Information message using the Cell-Radio Network Temporary Identifier.

17. The network element of claim 11, wherein the Downlink Control Information message comprises a sounding group identifier that identifies the sounding group comprising the plurality of users equipment.

18. The network element of claim 11, wherein the processor is configured to mask the Downlink Control Information message using a sounding group identifier.

19. The network element of claim 11, wherein the processor is configured to one or more of:
- schedule an uplink transmission to the user equipment based on the received sounding signal, and
- determine a set of assigned uplink resource blocks based on the received sounding signal.

20. The network element of claim 11, wherein the processor is configured to, in addition to receiving a sounding signal in response to transmitting the Downlink Control Information message, receive a periodic sounding signal from the user equipment over the uplink channel.

21. A user equipment that is capable of operating in an Orthogonal Frequency Division Multiplexing communication system and that comprises a processor that is configured to receive a Downlink Control Information message instructing the user equipment to transmit a sounding signal, wherein the Downlink Control Information message comprises a sounding signal group map that is associated with a sounding group comprising an plurality of users equipment and wherein the sounding signal group map identifies which user equipment, among the plurality of users equipment, is instructed to transmit a sounding signal and, in response to receiving the message, transmit a sounding signal from the user equipment over an uplink channel.

22. The user equipment of claim 21, wherein the processor is configured to receive the Downlink Control Information message over a Physical Downlink Control Channel.

23. The user equipment of claim 21, wherein the Downlink Control Information message comprises sounding configuration information associated with the user equipment, which sounding configuration information comprises one or more of:
- a frequency location of one or more sub-carriers allocated for transmission of the sounding signal,
- a time period during which to transmit the sounding signal,
- a cyclic shift parameter,
- a hopping parameter,
- an antenna index,
- a carrier index, and
- an orthogonal code to use for the sounding signal.

24. The user equipment of claim 23, wherein the sounding configuration information comprises an indication that the user equipment is to hop across a frequency bandwidth over a plurality of time periods in sounding the uplink channel.

25. The user equipment of claim 23, wherein the Downlink Control Information message comprises a Cell-Radio Network Temporary Identifier associated with the user equipment.

26. The user equipment of claim 21, wherein the Downlink Control Information message comprises a sounding group identifier that identifies the sounding group comprising the plurality of users equipment.

27. The user equipment of claim 21, wherein the processor is configured to both periodically transmit a sounding signal and to transmit a sounding signal in response to receiving, from a radio access network, a sounding signal trigger.

28. A method for providing channel sounding in an Orthogonal Frequency Division Multiplexing communication system, the method comprising:
- determining to request that a user equipment sound an uplink channel;
- transmitting a Downlink Control Information message to the user equipment instructing the user equipment to convey a sounding signal;
- in response to transmitting the Downlink Control Information message, receiving a sounding signal from the user equipment over the uplink channel;
- scheduling a downlink transmission to the user equipment based on the received sounding signal; and
- determining a set of weights in association with a plurality of antenna elements for a downlink transmission to the user equipment based on the received sounding signal.

* * * * *